(12) United States Patent
Wight, Jr.

(10) Patent No.: US 6,227,699 B1
(45) Date of Patent: May 8, 2001

(54) SPIRAL CUT HONEYCOMB BODY FOR FLUID MIXING

(75) Inventor: John F. Wight, Jr., Corning, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/467,743

(22) Filed: Dec. 20, 1999

(51) Int. Cl.[7] ............................... F28F 1/14; B32B 3/20; B01F 5/06
(52) U.S. Cl. .......................... 366/336; 165/184; 428/188; 428/192; 428/398
(58) Field of Search ..................................... 366/336, 337, 366/338, 339, 340; 428/188, 192, 397, 398, 399, 400; 165/183, 184

(56) References Cited

U.S. PATENT DOCUMENTS

| | | |
|---|---|---|
| 3,887,741 | 6/1975 | Dwyer .................................. 428/188 |
| 5,032,156 | 7/1991 | Luder et al. . |
| 5,240,663 | 8/1993 | Stringaro et al. . |
| 5,525,291 | 6/1996 | St. Julien . |
| 5,633,066 | 5/1997 | Lipp et al. . |
| 5,928,521 | 7/1999 | Levec . |

FOREIGN PATENT DOCUMENTS 0705962  4/1996  (EP) .

*Primary Examiner*—Tony G. Soohoo
(74) *Attorney, Agent, or Firm*—Kees van der Sterre

(57) ABSTRACT

A honeycomb article has longitudinal channels extending from one face to a second face. A portion of the honeycomb is removed by cutting away a helical slot that depthwise extends from the outer surface of the honeycomb through a majority of the channels and lengthwise extends along the honeycomb channel axis commencing at or near the first face and toward the second face. The helical slot traverses a minimum of one rotation around the honeycomb axis. The honeycomb article can be used in a number of applications including heat exchange, thermal mixing, physical mixing, chemical stripping, and chemical reactions of one or more workstreams entering from one face, or entering in a countercurrent mode from both faces.

17 Claims, 2 Drawing Sheets

SPIRAL CUT HONEYCOMB BODY FOR FLUID MIXING

BACKGROUND OF THE INVENTION

This invention relates to honeycomb articles and more particularly to honeycomb articles for providing mixing of one or more workstreams between individual channels of the honeycomb by using grooved areas to segment the individual channels and serve as mixing sites to thermally equilibrate, physically mix, or chemically react the various workstreams.

Honeycomb articles have been well documented in the patent literature. They can be used in a number of very useful applications involving their chemical, physicochemical, physical, and mechanical properties. These include such diverse uses as purification, filtration, chemical reaction vessels, photonic band gap structures, microlens arrays, high temperature dielectric materials and even lightweight structural supports. They have been found exceptionally useful as components of catalytic converters for vehicles operating with internal combustion engines.

Because of their structure, honeycomb articles have a high surface area along with low pressure drop. This combination can be used advantageously in some applications, especially compared to applications that use packed bed columns. In these cases, the honeycomb article may not be merely an inert feature in the process, but rather may be a dynamic participant, involved either by utilizing the chemical composition of its channel walls to react with a workstream or its ability to adsorb specific materials from the workstream. These properties can be modified by temperature control or by designing the honeycomb with a specific composition such as glass, ceramic, metal, or graphite or by adjusting the porosity of the channel surfaces and walls. Further modifications can be achieved by coating the surface of the honeycomb channels with reactive, catalytic or adsorptive materials. This great amount of flexibility of design and fairly simple manufacture has made honeycomb structures commonplace in such diverse areas as fluid separations and catalytic converters.

Despite the many advantages and uses for honeycomb articles, these structures have some characteristics that are disadvantageous for certain applications. One such characteristic is that the individualized channels, even with good porosity, do not provide good mixing among workstreams in adjacent channels. For the purpose of this patent, workstreams are defined as feedstock fluids such as a gas or liquid to which either a chemical or physical change is desired. This segregated channel flow of honeycombs is not disadvantageous in certain applications where a single workstream is being processed in an isothermal environment. In other cases, however, the lack of either thermal or physical mixing can lead to inefficiencies or, in worst cases, complete failure of a desired process.

The requirement for good mixing and thermal equilibrium has led to designs that are related to honeycomb structures but allow for intermixing between channels. These structures are invariably complex and correspondingly more difficult to manufacture. To fabricate such structures by extrusion, movable dies are generally required. There is significant difficulty cleaning moveable die equipment and maintaining a continuous operation, free from downtime. Examples of such mixing articles and processes for making such articles can be found in U.S. Pat. No. 5,032,156 to Luder et al., U.S. Pat. No. 5,240,663 to Stringaro et al., U.S. Pat. No. 5,928,521 to Levec, U.S. Pat. No. 5,525,291 to St. Julien, and European Patent Application EP 0,705,962A to Toyao et al.

Therefore there exists a need to provide an economic structure that will allow facile chemical and/or thermal mixing of various workstreams. Another need is to provide a structure that allows for good mixing and intimate contact of workstreams from countercurrent flow. Still another need is to develop a structure for mixing or use as a substrate for active catalysts, adsorbers, etc. that will provide the ability to process great quantities of fluids without experiencing a great pressure drop, yet be easily manufactured.

SUMMARY OF THE INVENTION

In accordance with the invention a honeycomb article has been developed that facilitates the mixing of workstreams among the individual channels, yet still substantially preserves the partitioned flow characteristics and high surface area-to-volume ratio needed for chemical processing applications requiring high mass transfer efficiency. Moreover, the article can be made using traditional honeycomb designs as starting points for honeycomb article fabrication.

In one aspect, then, the invention includes a honeycomb article comprising a plurality of longitudinal channels extending from one end face to a second end face of the article that has a portion of the honeycomb removed by cutting at least one helical slot or groove into the honeycomb side surfaces. The helical slot or slots extend depthwise into the honeycomb from the honeycomb periphery in a direction generally transverse to the orientation of an imaginary axis joining the centers of the end faces. In general, the slots or grooves will have lengths sufficient to encircle the honeycomb at least once, and will have depths sufficient to intersect at least a majority (50% or more) of the channels making up the honeycomb at one or more points along their lengths. They may originate at points spaced away from the honeycomb end faces, or may extend continuously from the first end face to the second end face of the article, and may encircle the article one or multiple times over the course of their paths.

The honeycomb article thus described can be used in a number of applications including heat exchange, thermal mixing, physical mixing, chemical stripping, and chemical reactions of one or more workstreams entering from one face or in a countercurrent mode from both faces. In a second aspect, therefore, the invention includes a method for processing a workstream for any of a wide variety of such applications.

In summary, the method of the invention comprises first introducing a workstream into a honeycomb body comprising a first end face, a second end face, and a plurality of open-ended channels bounded by shared channel walls disposed between and connecting the first end face to the second end face. As earlier described, the body includes at least one encircling helical slot discontinuity extending inwardly through the channel walls toward an axis joining the centers of the first and second end faces. The slot discontinuity is of a depth sufficient to intersect at least a majority of the channels present in the body.

The workstream introduced into the first end face of the body is directed first into and through the first sections of the channels intersected by the helical slot discontinuity. It within these channels sections that processes such as adsorption, catalytic reaction, and/or other physical or chemical processes will be initiated.

Thereafter, the workstream is released into the helical slot discontinuity where mixing is allowed to occur. Again, mixing may serve to thermally or chemically equilibrate the workstream, or simply achieve better physical mixing thereof.

Once equilibration, mixing or the like has proceeded to a greater or lesser degree within the helical slot, the workstream is re-directed into and through second sections of the channels intersected by the slot for further interactions with the channel walls. This process may of course be repeated one or multiple times along the length of the honeycomb depending upon the number of slot intersections provided, until the workstream is finally discharged from the second end face of the honeycomb in processed form.

BRIEF DESCRIPTION OF THE DRAWINGS

The invention may be further understood by reference to the following detailed description taken in conjunction with the accompanying drawings wherein.

DETAILED DESCRIPTION OF THE INVENTION

Figure 1:
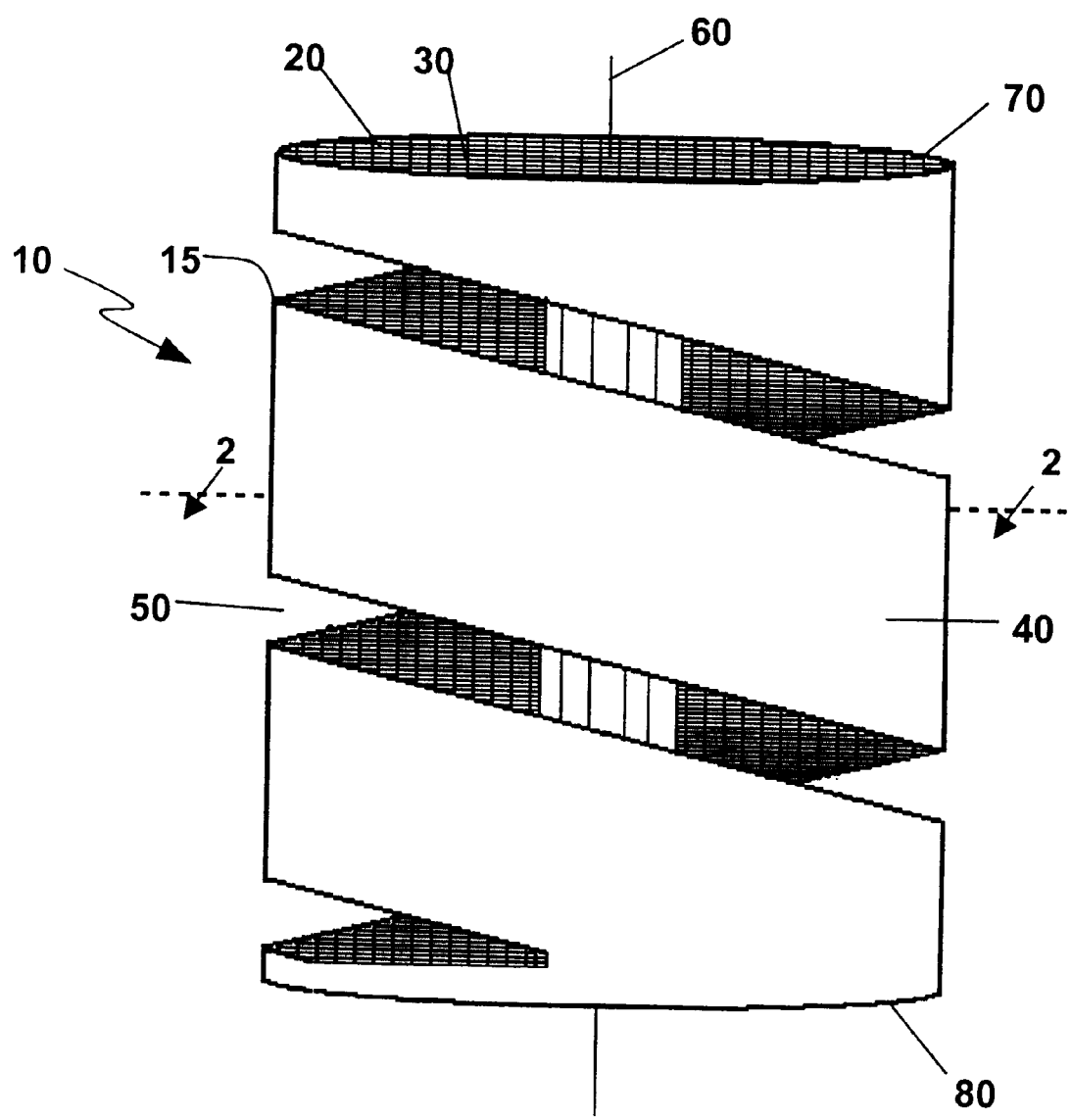
FIG. 1 is a perspective view of a honeycomb structure embodying the present invention.

The honeycomb structure to be provided in accordance with the invention may be of essentially any size and shape, but is typically a regular solid having a closed cylindrical or polygonal shape and a corresponding (e.g., elliptical, circular, square, hexagonal, etc.) cross section. FIG. 1 of the drawings depicts an extruded monolithic honeycombed structure 10 of generally circular cross-section incorporating a plurality of channels or cells 20 having substantially parallel cell axes aligned with the central longitudinal axis 60 of the structure. The cells 20 extend from one end 70 to the other end 80 of the structure 10.

The structure provided may include a smooth peripheral sheath or wall, or it may included exposed channel wall structure to be enclosed by other means. Periphery 15 of structure 10 in FIG. 1 includes a smooth integral wall 40 which circumscribes the structure 10 and typically comprises the same material as do the walls 30 of the cells 20. Extending in a helical fashion around the periphery 15 is a slotted groove 50 that cuts transversely into the body of the honeycomb structure 10. In this manner, the internal channels 20 are cut to a predetermined distance and therefore segmented by the slotted groove 50.

The spiral nature of slotted grooves such as groove 50 in FIG. 1 imparts a mixing function to the articles of the invention that is quite distinct from the workstream interactions obtainable in conventional honeycomb arrangements comprising stacks of spaced crosscut segments or discs of honeycomb material. This results from the substantially higher workstream flow velocities transverse to the direction of channel orientation that are imparted by the angled orientation of the spiral grooves.

Figure 2:
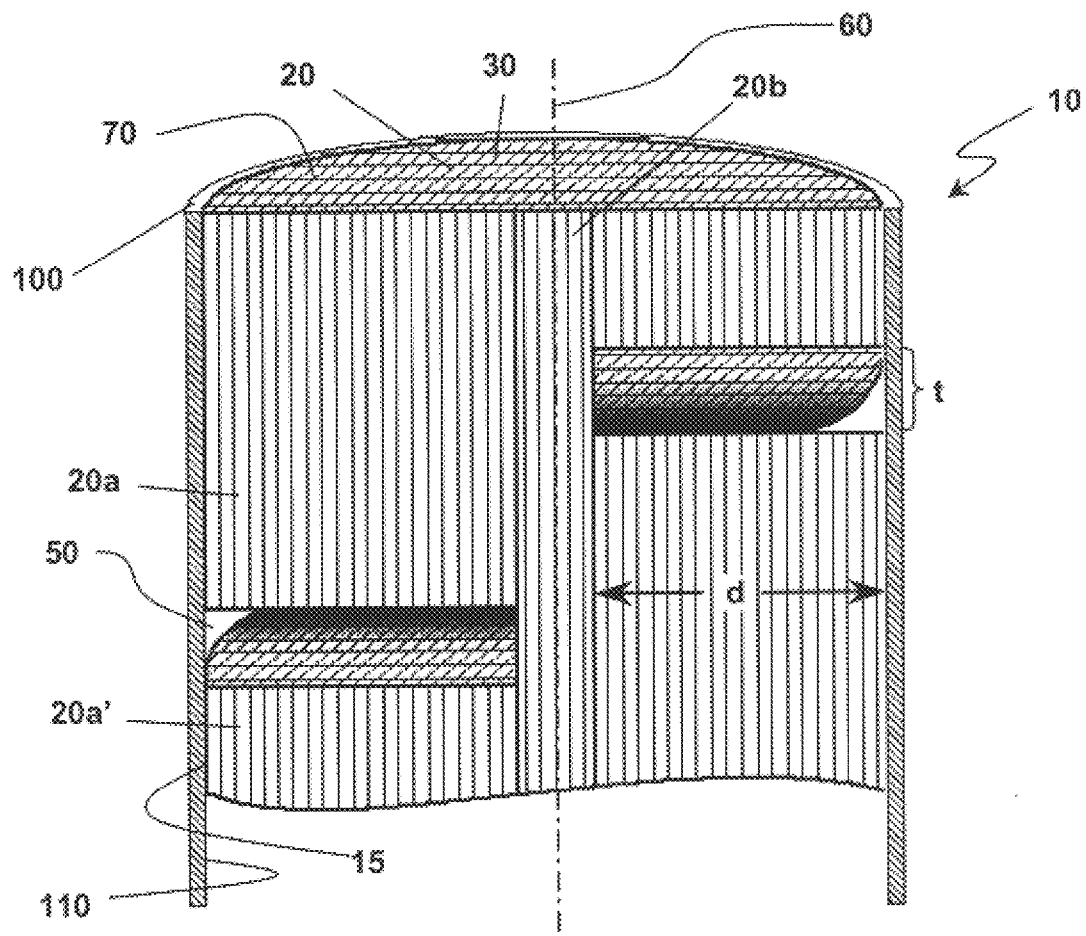
FIG. 2 is cross sectional view of the structure in FIG. 1 taken along section line 2—2 thereof.

FIG. 2 depicts a cross section of the monolithic honeycomb structure 10 depicted in FIG. 1. In FIG. 2 one segment of a channel 20 is depicted at reference numeral 20a, while 20a' depicts a second segment of the same channel 20. Unsegmented channels 20b may remain in the body if desired. When present these are generally more proximate to the central axis 60 and more remote from the peripheral wall 40 than the intersected channels.

The area within the grooved slot 50 is essentially a common area for all the segmented channels 20a–20a'. In this area a workstream, not shown, that has come from a specific segmented channel 20a can mix with a workstream from another segmented channel 20aa. After contact and mixing the mixed workstream can be segmented and redirected into other segmented channels 20a' on the opposite side of the slotted groove 50. The newly formed workstreams then continue their respective paths in columnar flow fashion through channel segments 20a, 20a' until they reach the next grooved slot, where mixing can again occur. The depth of the groove 50 within the honeycomb structure 10 as depicted in FIG. 2 is arbitrarily selected and is not intended to limit scope of the invention.

Also depicted in FIG. 2 is an optional enclosure 100 within which the honeycomb structure 10 may reside. Providing intimate contact between the periphery 15 of the honeycomb article 10 and the inner wall 110 of the chamber 100 as shown in FIG. 2 is a useful option to insure that no portion of the workstream can by-pass the channeled structure by escaping from groove 50 into an annular gap between the channel structure and inner wall 110.

Figure 3:
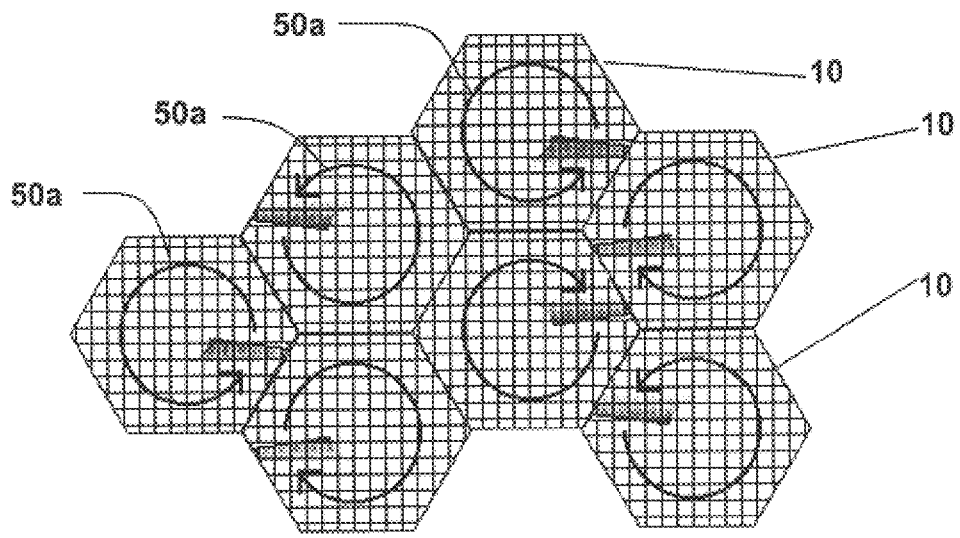
FIG. 3 is a cross-sectional view of a close-packed bundle of honeycomb components making up a flow structure of large open frontal area in accordance with the invention.

As aforementioned, the honeycomb article 10 of the present invention may have a cross sectional shape that is circular, oval or of a regular or irregular polygonal shape. For applications requiring a large expanse of open honeycomb frontal area it may be useful to select a honeycomb cross-section that will allow close packing of aggregates of the monolith honeycomb articles 10. Square, triangular, and hexagonal shapes are examples of cross-sections that can provide a close-packed array of honeycombs incorporating mixing slots or grooves. FIG. 3 of the drawing illustrates a bundle of honeycombs of hexagonal cross-section arranged to provide a close-packed structure of this type.

One option available for bundled honeycomb arrays is to design slot arrangements and alignments for each of the honeycomb components so as to achieve a controlled level of internal mixing within the bundled structure. That is, if each honeycomb incorporates one or more slotted grooves and the sides of each of the honeycombs are designed fit closely against the sides of adjacent honeycombs, then intermixing of workstreams among the honeycombs can be provided. In addition, the amount of workstream intermixing between honeycombs can be controlled by controlling the extent to which the spiral grooves in each honeycomb are open to the spiral grooves in adjacent honeycombs.

Referring again to FIG. 3, each honeycomb element 10 may incorporate one or more spiral grooves encircling its periphery in the direction of arrows 50a. Through proper alignment of the elements 10 and/or the inclusion of multiple grooves 50a therein, at least some intermixing can occur across one or multiple faces of every honeycomb in the bundle.

The amount of intermixing in bundles such as illustrated in FIG. 3 can be controlled by controlling the width of the grooves on all or selected ones of the honeycomb components or selected faces thereof. Other approaches to control intermixing include controlling the pitch and phase of the spiral grooves to effect controlled matching among the grooves, using multiple spiral grooves on each honeycomb element, and using combinations of right-hand and left-hand screw directions for the grooves on the various elements to control the levels of intermixing turbulence at the honeycomb component interfaces.

The honeycomb substrate can be made of various materials including ceramic, plastic, glass, or metal. Depending on the final application of interest, one or another of these compositions will be preferred.

For some applications it will be desired that the composition of the honeycomb be chemically inert to the workstream. For other applications active surfaces effecting adsorption, catalytic reactions, or other interactions with workstream components may be provided. Other design factors taken into consideration are brittleness, thermal stability, dimensional stability, transparency, porosity of channels, and ability to affix catalytic addenda.

When the honeycomb article comprises a ceramic material, useful ceramics include any of a number of oxide, carbide, nitride, or other ceramics of conventional or novel composition having physical or chemical properties appropriate for the end application being addressed. Specific examples of ceramics having known utility for the fabrication of honeycomb structures include cordierite, gamma alumina, and mullite. When the honeycomb article comprises a glass material, glasses such as fused silica, borosilicate, aluminosilicate, boroaluminosilicate and other glasses of reasonable thermal and chemical stability will typically be selected.

Metal honeycombs may also be employed for particular applications, and in those cases any of a wide variety of metals including copper, zinc, nickel, aluminum, steel, silver, gold, platinum, and commercially important alloys such as Hastelloy™ can be employed. Similarly, honeycombs formed of resins or plastics can be employed, these being fabricated from such polymers as high density homo- and copolymers of polyethylene (e.g., ultrahigh molecular weight polyethylene), chemically inert fluorocarbon polymers such as Teflon polymers, and high temperature plastics such as formaldehyde-phenol (Bakelite™ plastics) may be selected.

As previously mentioned, the honeycomb 10 can be made by any known method but typically extrusion is the preferred process. Useful fabrication methodologies and honeycomb substrates that can be used as starting points for the present invention can be fabricated as described in U.S. Pat. No. 3,112,184 to Hollenbach, U.S. Pat. No. 3,790,654 to Bagley, and U.S. Pat. No. 3,885,977 to Lachman et al., all hereby incorporated by reference in their entirety. These monolithic structures may be extruded by the known methods as described in the aforementioned patents to form a monolithic honeycomb is manufactured in a single step.

If glass or ceramic materials are used, then the green material that is extruded may require sintering. In the case of glass, the final glass material may be redrawn to create a narrower honeycomb article possessing small cross sections for each channel.

The invention is not limited to honeycomb articles that possess an integral circumferential wall, sheath, or skin that surrounds the plurality of channels. Any enclosure into which the honeycomb with circumferential channels has been placed can operate to confine fluids carried by peripheral channel structure to paths within those peripheral channels.

Channel cross section shapes and dimensions can vary considerably within the scope of this invention. Typical values between 20 and 900 cells per square inch are useful. The shape of the cross section of the individual channels 20 is not consequential to the utility of the article 10. Typically, regular polygons are employed, with squares, rectangles, triangles, hexagons being the most common.

It is within the scope of this invention that the channels 20 can be straight or curved, that the channels can be regularly or irregularly oriented to each other, that channel wall thickness may or may not be fixed, and that mixtures of channel cross section shapes can be employed. For example, U.S. Pat. No. 5,633,066 describes useful starting structures wherein the channels themselves follow spiral paths through the honeycomb. Channel wall thicknesses in the range of about 0.001 to 0.020 inches are typically seen in ceramic honeycomb starting structures produced by extrusion.

Slotted grooves can be cut in selected honeycomb starting structures using any mechanical or noncontact process. Referring to FIG. 1, a grinding process may be used to produce groove 50 by supporting honeycomb 10 for rotation about its major axis 60 and rotating the honeycomb while in contact with a drill or grinding rod traversing its length. In this process a cutting element is first placed in contact with the peripheral edge 15 of honeycomb 10 and allowed to penetrate to a defined depth. Then the cutter is moved at a fixed speed along the major axis 60 of honeycomb 10 while the honeycomb is rotated at a fixed rate to define the pitch of helical groove 50.

Grooves are most easily cut into powder-formed ceramic honeycombs while in the green (unfired) state, but can also be formed after firing the honeycomb to remove binder constituents and sinter or reaction-sinter the powder components to final density and strength. One advantage of the latter approach is that groove distortion during firing can be avoided.

The slot cut into the honeycomb to create groove 50 will normally be perpendicular to the major axis 60 of the honeycomb, but rotation away from perpendicular can be useful for some purposes. Non-contact methods for cutting groove 50 include the use of high powered lasers and liquid jet cutters, the latter being most useful with green honeycomb bodies.

The thickness, t, of the slotted groove 50 defines one of the parameters of the mixing area between the channel segment workstreams. Optimal thickness depends on the workstream, but values ranging from $\frac{1}{16}$" to $\frac{1}{2}$" are useful for most applications.

Referring to FIG. 2, if honeycomb article 10 is cylindrical in shape, then a transversal cut of depth d extending radially inward to traverse approximately 30% of the radius of the cylinder will intersect 50% of the channels 20 within the honeycomb 10. Likewise, a transversal cut of 50% of the radial distance cuts through 75% of the channels 20.

A transversal cut of 100% or more of the will cut through all channels 20. While such a cut somewhat reduces the structural integrity of the honeycomb 10 to longitudinal and radial forces, central or peripheral supporting structure provided by mounting or supporting hardware can impart any necessary strength or stiffness to the resulting structure. In any case, for best mixing performance in unitary slotted structures, it is preferred that 75–95% of the cells be traversed by a groove. The remaining cell structure may or may not be plugged as desired, depending upon whether workstream flow through residual unbroken channels is acceptable for the particular application.

Although a discontinuous slotted groove can be utilized in the present invention, it is preferred from both ease of production and efficiency of mixing that the slotted groove 50 extend essentially uninterrupted from one face 70 to the second face 80.

In any case, it will readily be appreciated from the foregoing description that, for any individual honeycomb design, the depth, width, pitch and number of spiral grooves can be tuned with respect to the specific honeycomb design parameters of cell density, size, shape and wall thickness to achieve the precise balance between channeled flow and spiral mixing that may be needed for supporting the particular reaction or other treatment conditions required. This is particularly useful since the workstream processing of interest may vary from that intended to effect chemical changes to the workstream, e.g., for the removal of contaminants, chemical reactions such as acid-base neutralization, ion exchange, redox or the like, and physical changes such as thermal equilibration, phase changes, and complex mixing/chemical equilibration processes.

Employing the honeycomb articles provided in accordance with the invention permits the adoption of a number of different processing options not available with other treatment media. In its simplest embodiment, treatment simply involves introducing the workstream into the honeycomb article 10 at one end 70 and withdrawing it at the opposing end 80 after having undergone the desired chemical or physical processing. Alternatively, two workstreams may enter the honeycomb 10 through the same end face 70 but via different channels 20 so that initially the workstreams are isolated one from the other. The workstreams then exit at the opposing end 80 in a state that can be essentially homogeneous and equilibrated, if desired.

In yet another processing variation, one workstream enters the honeycomb article 10 through cell openings at the first end 70 while a second workstream enters the honeycomb article 10 through cell openings at the second end 80. The workstreams flow through the honeycomb article 10 in a counterflow configuration, with high interaction occurring in the slotted region of the honeycomb. The products are then withdrawn from the structure through open cells at opposing ends 80 and 70 respectively. Processes that may be considered for this embodiment include chemical stripping and thermal equilibration, particularly where one workstream is a liquid and the second workstream is a gas.

While it is desirable to support the honeycomb article or bundle within a suitable enclosure or conduit to guide the workstream through the structure and to prevent undesirable fluid by-pass, the particular construction or composition of the chamber is not critical. Further, manifolding or other associated apparatus for directing or apportioning the workstream for efficient delivery to or collection from the honeycomb structures can be designed to achieve particular workstream distributions that may be appropriate for a particular reaction or honeycomb design.

A representative example of a honeycomb article provided in accordance with the invention involves the manufacture of a grooved right cylindrical honeycomb body having a diameter of about 4 inches, a length of about 14 inches, and a composition consisting essentially of cordierite. The channel structure of the article is characterized by cell density of about 400 square channels per square inch of honeycomb cross-section and a channel wall thickness of about 0.004 inches.

To make this article, a plasticized powder batch comprising alumina, kaolinitic clay and talc in proportions yielding a cordierite composition together with water and a methylcellulose binder/plasticizer is extruded through a honeycomb die to form a cylindrical honeycomb blank of the required dimension, and then dried. Thereafter the dried blank is positioned on the bed of a drill press and a single helical groove is cut into the side surface of the honeycomb by means of a drill.

The groove thus formed has a depth of about 1.5 inches measured radially from the outer circumference toward the center cylinder axis of the honeycomb in a direction perpendicular to that axis. It has a width of about 0.25 inches, and extends from one end to the other of the structure at a pitch providing 12 full turns about the honeycomb axis over the full length of the part.

The honeycomb thus machined is next fired to a temperature and for a time sufficient to convert the alumina-clay-talc mixture to cordierite, and is then cooled to room temperature for inspection. The product is a relatively stiff and strong yet open honeycomb structure wherein approximately 94% of the channels cross the spiral groove at twelve spaced points along their length. Two factors contribute to the effective mixing of a liquid workstream traversing the channels and groove intersections of this honeycomb. First, the mixing chambers formed by the grooves occupy about 20% of the length of each intersected honeycomb channel provided in the honeycomb structure. Secondly, the spiral configuration of the grooves imparts a significant fluid flow velocity component transverse to the flow direction of fluids entering the mixing chambers from the channels at each chamber entry point.

Although preferred embodiments of the invention have been shown and described and various alternatives and modifications have been suggested, it will be understood that the appended claims are intended to cover all embodiments and modifications which fall within the true spirit and scope of the invention.

What is claimed is:

1. An integral honeycomb body comprising a first end face, a second end face, and a plurality of open-ended channels bounded by shared channel walls disposed between and connecting the first end face to the second end face, wherein at least one helical slot discontinuity encircles the body and extends inwardly through the channel walls toward an axis joining the centers of the first and second end faces in a direction transverse to that axis, the slot being of a length and depth at least sufficient to intersect a majority of the channels present in the body.

2. The integral honeycomb body as recited in claim 1 wherein said channels are substantially parallel to one another and the slot extends inwardly in a direction perpendicular to the channels.

3. The integral honeycomb body as recited in claim 1 wherein said channels follow generally helical paths from the first end face to the second end face.

4. The integral honeycomb body as recited in claim 1 wherein said helical slot discontinuity extends lengthwise continuously from said first face to said second face.

5. The integral honeycomb body as recited in claim 1 wherein said helical slot discontinuity begins and ends at points spaced away from the first and second end faces.

6. The integral honeycomb body as recited in claim 1 wherein more than 50% and up to 100% of the channels are intersected by a helical slot.

7. The integral honeycomb body as recited in claim 1 wherein said transverse helical slot encircles the body at least once.

8. The integral honeycomb body as recited in claim 1 wherein said honeycomb body is formed of a glass or a ceramic.

9. The integral honeycomb body as recited in claim 1 wherein said honeycomb body is formed of a plastic.

10. The integral honeycomb body as recited in claim 1 wherein said honeycomb body is formed of a metal.

11. A method for processing a workstream which comprises:

introducing the workstream into a honeycomb body comprising a first end face, a second end face, and a plurality of open-ended channels bounded by shared channel walls disposed between and connecting the first end face to the second end face, the body including at least one encircling helical slot discontinuity extending inwardly through the channel walls toward an axis joining the centers of the first and second end faces, the slot discontinuity intersecting at least a majority of the channels present in the body, directing the workstream into and through first sections of channels intersected by the helical slot discontinuity;

mixing the workstream in the helical slot discontinuity; and directing the workstream into and through second sections of the channels intersected by the helical slot discontinuity.

12. A method in accordance with claim 11 wherein mixing the workstream effects a thermal equilibration thereof.

13. A method in accordance with claim 11 wherein mixing the workstream effects a chemical equilibration thereof.

14. A method in accordance with claim 11 wherein mixing the workstream effects a physical homogenization thereof.

15. A method in accordance with claim 11 wherein first and second workstreams are introduced into the first and second end faces of the honeycomb body.

16. A method in accordance with claim 15 wherein the first workstream is a gas and the second workstream is a liquid.

17. A method in accordance with claim 11 wherein the honeycomb body is disposed in an enclosure provided with means for heating or cooling the workstream traversing the body.

* * * * *